United States Patent Office 3,458,173
Patented July 29, 1969

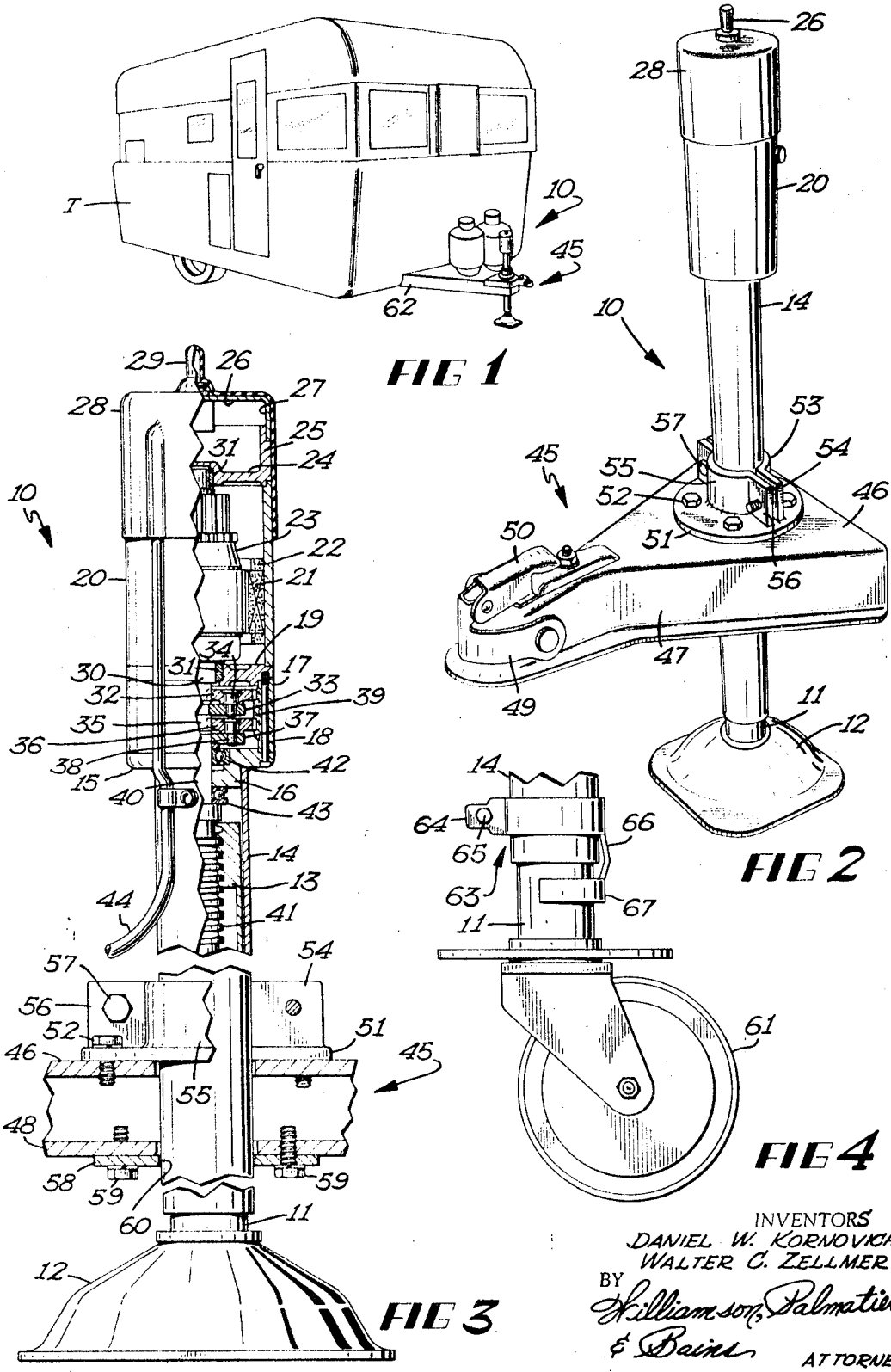

3,458,173
TRAILER JACK
Daniel W. Kornovich and Walter C. Zellmer, Minneapolis, Minn., assignors to Lectra Power, Inc., Minneapolis, Minn., a corporation of Minnesota
Filed June 6, 1967, Ser. No. 644,007
Int. Cl. B60s 9/02
U.S. Cl. 254—86         4 Claims

ABSTRACT OF THE DISCLOSURE

A power operated trailer jack including an electric motor having a revolvable output shaft to which is secured an elongate vertically disposed screw. An elongate inner tube having a nut affixed to the upper end thereof threadingly engaging the screw, and an elongate outer tube positioned concentrically around the inner tube and being secured to the motor housing for movement therewith. A trailer coupler mechanism secured to the outer tube and connectible to the conventional trailer tongue whereby when the motor is energized, the screw will be revolved to produce longitudinal translation between the inner and outer tubes, thus permitting the lower end of the trailer jack to be selectively moved into and out of engagement with the ground to support the front end of a trailer.

---

This invention relates to trailer jacks and more specifically to a power driven trailer jack.

An object of this invention is to provide a novel and improved electrically operated trailer jack, which is readily attachable to the tongue of a conventional trailer, and which when energized, may be extended into a supporting position for support of the front end of a trailer or may be readily retracted to an inoperative position.

A more specific object of this invention is to provide a novel electrically operated trailer jack, including an outer tube, which is rigidly but detachably connected to a coupler mechanism for a trailer and which has an electric motor carried by the upper end thereof, a ground engaging inner tube projecting interiorly of the outer tube and engaging a revolvable screw, which is driven by the electric motor, whereby upon energizing the motor, the jack may be readily extended or retracted by a user.

These and other objects and advantages of this invention will more fully appear from the following description made in connection with the accompanying drawings wherein like reference characters refer to the same or similar parts throughout the several views, and in which:

FIG. 1 is a perspective view of a conventional trailer illustrating our novel trailer jack device mounted on the tongue of the trailer;

FIG. 2 is a perspective view of our novel trailer device;

FIG. 3 is an elevational view thereof foreshortened for clarity and with certain other parts thereof broken away to better illustrate other parts; and FIG. 4 is an elevational view on an enlarged scale of the lower end portion of the trailer jack illustrating the optional use of a caster wheel thereat.

Referring now to the drawings, and more specifically to FIGS. 2 and 3, it will be seen that one embodiment of our novel electrically powered trailer jack device designated generally by the reference numeral 10 is there shown. This trailer jack device 10 includes an elongate generally cylindrically shaped inner tube 11, which is detachably secured to a concavo-convex base plate 12. This base plate 12 as shown, engages the surface of the ground when the trailer jack is in supporting relation with a trailer and its convex side is presented upwardly. The upper end of the inner tube 11 has a nut 13 integrally formed therewith and projecting upwardly therefrom.

An outer tube 14, which is also of elongate cylindrical configuration is positioned concentrically around the inner tube 11 and these tubes are telescopically extensible and retractable relative to each other. A lower support plate 15 is fixedly mounted to the upper end of the outer tube 14 and this lower support plate, which is of generally circular configuration has a reduced lower end 16, which is positioned in snug fitting relation within the upper end of the outer tube 14. The lower support plate 15 is rigidly secured to a generally cylindrical hollow gear housing 17 by screws 18. It will be noted, that the screws 18 also threadingly engage an annular intermediate support plate 19, which is positioned upon the upper end of the gear housing 17.

A generally elongate substantially cylindrical electrical motor housing 20 is rigidly secured to the intermediate support plate 19 and projects upwardly therefrom. The motor housing 20 houses the conventional components of an electric motor, which include the pole core or stator 21, the field coil 22, and the rotor or armature 23. A generally circular upper support plate 24 is secured to the upper end of the motor housing 20, as best seen in FIG. 3. It will be noted, that this upper support plate 24 has a sleeve or annular flange 25 integrally formed therewith and projecting upwardly therefrom. The upper end of the upper support plate 25 is closed by a cover plate 26, which has a downturned annular flange or sleeve 27 integrally formed therewith. It will be noted, that the sleeve 27 engages the upper end of the sleeve 25 in snug fitting relation therewith. A generally cup-shaped cap member 28 formed of a yieldable resilient impervious material, such as rubber, completely covers the upper end of the trailer jack device, including the cover plate 26, sleeve 27, sleeve 25 and the upper end portion of the electric motor housing 20.

It will be noted, that the cover plate 26 and upper support plate 24 define a housing in which are disposed the switch mechanism for the electric motor. The switch mechanism is of the double throw type, being swingable from an off or central position to either an up or down position. To this end, it is pointed out that the electric motor is of the reversible type and may be energized to run in opposite directions. The switch mechanism includes the switch actuator element 29, which projects exteriorly upwardly from the cover plate 26, and it will be noted that this switch actuator element is also covered by the cap member 28. It will be seen, that the rotor or armature 23 of the motor has an output shaft projecting from opposite ends thereof and the output shaft is journalled at its upper end by means of ball bearings 31 carried in a recess of the upper support plate 24. Similarly, the lower end portion of the shaft 30 is journalled in a lower ball bearing unit 31 carried by the intermediate support plate 19.

The output shaft 30, which projects downwardly from the rotor 23 has longitudinally or axially extending teeth therein, which mesh with the teeth of a pair of small gears 32 (only one of which is shown) which are positioned within the gear housing 17 and which are each revolvably mounted on a generally circular gear support plate 33 by pins or axles 34. The support plate 33 has a small pinion 34 integrally formed therewith and projecting downwardly therefrom, which is disposed in meshing engagement with a second pair of small gears 36 (only one of which is shown) each being revolvably mounted on a second gear support plate 37 by means of pins or axles 38.

It will be noted, that these small gears and gear support plates are all positioned within the gear housing 17 and between the lower and intermediate support plates. The inner circumferential surface of the gear housing also has axially extending teeth 39 formed thereat, which extend throughout the circumference of this gear housing to define an internal gear which is meshed with both pairs of gears 32 and 36 respectively. With this arrangement, when the output shaft 30 of the motor is revolved, the gears 36 will be revolved about their respective axes and these gears will also transmit their drive through their gear support plate 33 and the gears 36 to the gear support plate 37.

The gear support plate 37 has a shaft 40 integrally formed therewith and projecting downwardly therefrom and is fixedly connected with the upper end of an elongate screw 41. A ball bearing unit 42 journals the gear support plate 37 and its associated shaft 40 for rotation relative to the lower support plate 15 and it will also be noted that the thrust bearing 43 is interposed between the upper end of the screw 41 and the lower support plate 15. It will therefore be seen, that when the output shaft 30 of the motor is revolved, the screw will also be revolved and the coaction between the screw and nut will produce relative extension and retraction between the inner and outer tube of the trailer jack device. Electrical conductors 44 are interconnected with the switch mechanism and are connectible to a source of power for energizing the electric motor.

The trailer jack device also includes a coupling mechanism 45, which is adapted to be secured to the tongue of a trailer in a well known manner. It will be noted that the coupling mechanism used is of generally triangular configuration, including a top wall 46, opposed side walls 47 which are integrally formed with the top wall and which converge forwardly, and a bottom wall 47. The narrowed front end of the coupling mechanism has a conventional ball socket type hitch connector 49 mounted thereon, provided with a conventional latch mechanism 50 associated therewith. This hitch connector and latch mechanism is of well known construction and is adapted for ready attachment to and release from the male socket member carried by the prime mover, such as an automobile.

The top and bottom walls of the coupling mechanism 45 have registering openings therein, through which projects the outer tube of the trailer jack device. A substantially flat annular mounting plate 51 having suitable circumferentially arranged openings extending axially therethrough is bolted to the top wall 46 of the coupling mechanism by suitable bolts 52, so that the opening in the annular mounting plate is disposed in registering relation with the openings in the top and bottom walls. The mounting plate 51 has a split sleeve type mounting clamp secured thereto for releasable clamping engagement with the outer tube of the trailer jack device. This clamp includes a fixed clamp member 53, which is of arcuate configuration and which has a pair of ears 54 projecting outwardly therefrom which have threaded apertures therein. A similar shaped movable clamping member 55 having ears 56 which are provided with suitable threaded apertures is secured to the fixed clamp by bolts 57. It will be seen, that the split sleeve type clamp may be readily applied to the outer tube of the trailer jack device by merely tightening the bolts 57.

Referring again to FIG. 3, it will be seen that a generally annular flat stabilizing plate 58 is secured to the lower side of the bottom wall 48 by suitable bolts 59. It will be noted, that the inner circumferential edge 60 of the annular stabilizing plate 58 is disposed in close proximal but spaced relation from the outer tube 14. The purpose of this stabilizing plate is to stabilize mounting of the coupling mechanism to the outer tube 14, especially in those coupling mechanisms wherein the openings in the top and bottom walls of the coupling mechanism are substantially larger than the outer circumference of the outer tube. The opening in the stabilizing plate, as pointed out above and as clearly shown in the drawing, is disposed in close proximity to the exterior surface of the outer tube, thus stabilizing the outer tube and coupling mechanism with respect to each other.

Referring now to FIG. 4, it will be seen that a conventional caster wheel assembly 61 is also provided, which may be inserted into the lower end of the inner tube 11, which has a socket therein, to provide a mobile support at the forward end of the trailer when this is desired.

In use, the novel trailer jack device will be mounted on the forward end of the conventional tongue 62 of a trailer T in a well known manner. The coupling mechanism 45 will be secured to the outer tube at the desired location along the tube 14. In the event that the trailer T is connected in towed relation to a prime mover, such as an automobile, the inner tube 11 will be in a retracted position so that the base plate 12 will be disposed substantially above the level of the ground. When it is desired to support the front end of the trailer while disconnected from the prime mover, it is only necessary to move the switch actuator element 29 to the down position from the neutral position, thus energizing the electric motor and revolving the screw 41 in a direction to extend the inner tube 11. The inner tube will be translated vertically downwardly until the base plate 12 or caster 61 engages the surface of the ground. Since the outer tube 14 is fixedly connected to the coupling mechanism and is held against rotation relative to the inner tube 11, there is a tendency of the inner tube 11 to revolve as a result of the coaction of the nut 13 with respect to the screw 41. A brake mechanism is provided to permit vertical translation but to prevent any tendency of the inner tube to revolve relative to the outer tube. This brake mechanism includes a sleeve type clamp 63, which is provided with apertured ears 64 that are interconnected together by a suitable bolt 25 to permit the sleeve clamp to be clamped to the outer tube 14 adjacent the lower end thereof. This sleeve clamp 63 has an arm 64 integrally formed therewith and projecting downwardly therefrom, the arm 64 being bowed slightly outwardly and converging at its lower end towards the inner tube 11. An arcuate brake element 67 is integrally formed with the lower end of the arm 66 and is disposed in engaging relation with the inner tube 11 and thereby serves to prevent any tendency of the inner tube to rotate relative to the outer tube.

The trailer jack device may be used to adjust the front end of the trailer T to any given height as desired, and as pointed out is readily movable into and out of supporting relation with respect to the front end of the trailer. Although the trailer jack device has been illustrated in conjunction with a house type trailer, it is pointed out that the trailer jack device is also usable in conjunction with other trailers, such as boat trailers and the like.

From the foregoing description, it will be seen that we have provided a novel trailer jack device, which is power operated and is readily adaptable for any conventional trailer.

From the foregoing description, it will be seen that we have provided a trailer jack device, which is not only of simple and inexpensive construction, but one which functions in a more efficient manner than any heretofore known comparable device.

It will, of course, be understood that various changes may be made in the form, details, arrangement and proportions of the various parts without departing from the scope of our invention.

What is claimed is:
1. A trailer jack device comprising
   a reversible electric motor including a housing, a stator and a rotor in said housing, a shaft fixed to said rotor and revolvable therewith,
   an elongate threaded screw,
   a plurality of gear means drivingly interconnecting said screw with said shaft whereby said screw is revolved by said shaft,
   an elongate vertically oriented outer tube fixedly connected at its upper end with said motor housing and depending therefrom,
   an elongate vertically oriented inner tube positioned concentrically within said outer tube, a nut integrally formed with the upper end of said inner tube and projecting upwardly therefrom and threadingly engaging said screw whereby upon revolving movement of said screw, relative vertical translation will occur with respect to said inner and outer tubes, electrical conductors interconnected with said motor and being connectible to a source of electrical current to define a circuit for energizing said motor, double throw switch means interposed in circuit controlling relation with said conductors to permit said motor to be selectively energized and driven in opposite directions, a trailer coupler mechanism adapted to be connected to the tongue of a trailer and including upper and lower walls and opposed side walls, hitch means on the front end portion of said coupler mechanism, the upper and lower walls of said coupler mechanism being apertured and said outer tube extending through said apertures, an annular mounting plate mounted on the upper wall of said coupler mechanism and having a sleeve type clamp secured thereto for releasably engaging said outer tube, and a brake mechanism secured to said outer tube and engaging said inner tube to prevent relative rotation therebetween.

2. The trailer jack device as defined in claim 1 wherein said clamp comprises a fixed generally arcuate shaped clamp member and a movable arcuate shaped clamp member detachably secured to said fixed clamp member, said clamp member being readily adjustable into clamping relation with respect to said sleeve.

3. The trailer jack device as defined in claim 1 wherein said brake mechanism includes a sleeve type clamp secured to said outer sleeve and having an arm secured thereto and depending therefrom, an arcuate brake element on said arm engaging said inner tube and permitting relative vertical translation between said tubes but preventing relative rotation therebetween.

4. The trailer jack device as defined in claim 1 and an apertured stabilizing plate secured to the lower wall of the coupling mechanism, the inner circumferential edge defined by the opening in said plate being disposed in close proximal spaced relation with respect to the outer surface of said outer tube.

References Cited
UNITED STATES PATENTS 2,962,298 11/1960 Hefling _____ 280—150.5
3,244,401 5/1966 Iimura _____ 254—103
3,288,435 11/1966 Starkey _____ 254—86

ROBERT C. RIORDON, Primary Examiner
DAVID R. MELTON, Assistant Examiner

U.S. Cl. X.R.
254—103